Oct. 4, 1927.
C. FIELD
1,644,518
SUBLIMATION APPARATUS
Original Filed March 22, 1920
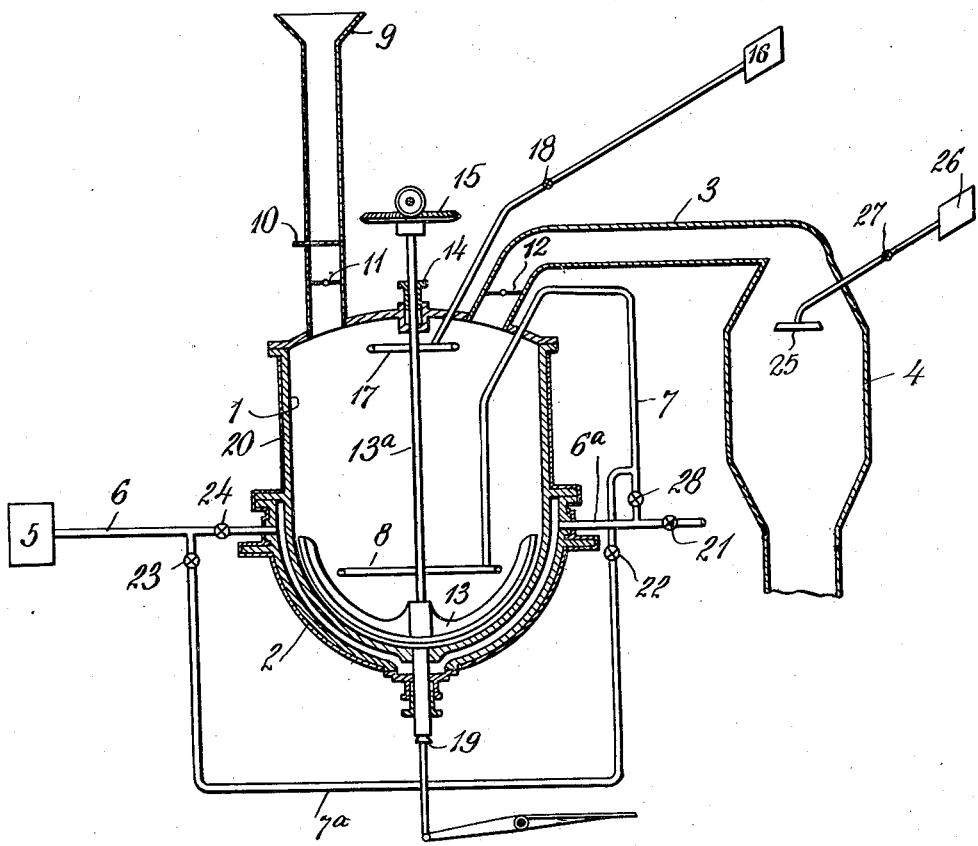
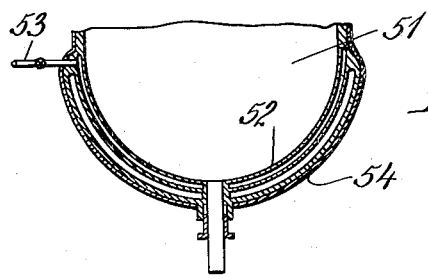
Inventor
Crosby Field
By his Attorneys Patented Oct. 4, 1927.

1,644,518

UNITED STATES PATENT OFFICE.

CROSBY FIELD, OF YONKERS, NEW YORK, ASSIGNOR TO NATIONAL ANILINE & CHEMICAL COMPANY, INC., OF NEW YORK, N. Y., A CORPORATION OF NEW YORK.

SUBLIMATION APPARATUS.

Original application filed March 22, 1920, Serial No. 367,821. Divided and this application filed February 11, 1921. Serial No. 444,120.

My invention is an improvement in sublimation apparatus, and relates to that type of apparatus especially designed for the sublimation of anthracene, anthraquinone and the like, and relates more particularly to an improved apparatus for carrying out the sublimation operation in a substantially continuous manner, and without the objectionable carrying over of undistilled particles, known as "dusting", by the method set forth in my application Serial No. 367,821, filed March 22, 1920, of which the present application is a division.

The object of the invention is to provide an apparatus, so constructed that the material to be sublimated may be fed, in relatively small charges, to a preheated vessel or container, and quickly brought into a plastic state under agitation, in a relatively quiet atmosphere, and may afterwards be heated to the temperature of sublimation by the circulation of heated gases in direct contact with the material to carry off the products of sublimation.

In the accompanying drawings;

Figure 1 shows, in a somewhat conventional and diagrammatic manner, the improved sublimation apparatus, in central vertical section, Figure 2 is a sectional view of a part of the apparatus, showing a modified construction.

The improved apparatus comprises a vessel or receptacle 1, of comparatively heavy material, as for instance cast iron, and having a heating jacket 2 which encloses the lower end of the vessel. The vessel is heated by means of superheated steam, hot air or other heated vapor or gas, which is introduced from a pipe 5 by means of a pipe 6, the said pipe 6 opening into the jacket at one side of the vessel. To provide a circulation of the heated gas, a pipe 6ª leads from the jacket at the opposite side of the vessel, and this pipe 6ª is controlled by a valve 21 of usual construction. A similar valve 24 is arranged in the pipe 6. A branch pipe 7 leads from the pipe 6ª, between the valve 21 and the vessel, and the said pipe extends upwardly above the top of the vessel, and then extends into the vessel, and terminates in a series of perforated coils 8, through which the heated gases may pass into the vessel. A pipe 7ª leads from the pipe 6 between the valve 24 and the pipe 5, and connects with the pipe 7 as shown. A valve 28 is arranged in the pipe 7 between the pipe 6ª and the connection of the pipe 7ª with the pipe 7, and valves 22 and 23 are arranged in the pipe 7ª.

The material is fed to the vessel, from a feeding hopper 9, connected to the vessel by a chute as shown, and valves 10 and 11 are arranged in the chute, for permitting predetermined amounts or charges of the material to be fed as desired. The vessel has also a vapor outlet pipe 3, leading to a condenser 4, and a valve 12 is interposed in this outlet pipe, for controlling the same. When the valves 10, 11 and 12 are closed, together with the valves 22 and 28, the vessel is a closed vessel, with no circulation of gases through the same. By properly manipulating the valves 21, 22, 23, 24 and 28, three conditions may obtain as regards the heating of the vessel. With the valves 22, 23 and 28 closed, there is no circulation through the vessel which would tend to carry away unsublimated particles, and the vessel is a closed vessel. At the same time the vessel may be heated, by opening valves 21 and 24, so that the heated gases pass through the jacket. By closing the valve 21, and opening the valves 22 and 23, there is a simultaneous circulation of the heated gases through the jacket, and through the vessel, it being understood that the outlet of the vessel, to be later described, is at this time open. With the valves 24 and 28 closed, and the valves 22 and 23 open, all of the heated gases are passed through the vessel. The receptacle or vessel 1 is provided with an agitator 13 at its bottom, and this agitator is rotated by a shaft 13ª which extends through the top of the vessel, through a stuffing box 14, and is driven by a suitable gearing indicated at 15. During the introduction of the charges, and during sublimation, there is a continuous agitation of the material by means of the agitator 13. The condenser 4 has arranged therein a perforated spray pipe 25, which is connected to a pipe 26, having a regulating valve 27.

In the operation of the apparatus, the heated gas, as for instance steam, is introduced through the pipes 6, 6ª, 7 and 7ª to the jacket 2, and to the interior of the vessel 1, so that the walls of the vessel are thoroughly heated. The steam or other gas is then shut off from the inside of the vessel, by closing the valves 22 and 28, and a small charge of the material to be sublimated, as for instance anthraquinone, is fed through the hopper 9 into the receptacle or vessel. As there is no steam passing into the vessel when the material is being introduced, dust is eliminated, excepting that caused by the falling of the material, and this is held in the vessel 1 by means of the damper 12, which at this time is closed. The material comes in contact with the preheated walls of the vessel, which have been heated to a temperature above the melting point and the material immediately absorbs heat therefrom, and in so doing becomes plastic, this action being assisted by the agitator 13. When the material has become plastic, the damper 12 is opened, and the valve 28 is opened to cause the hot gas to circulate through the vessel 1 in direct contact with the material to be sublimated. The material is subjected to the action of the hot gas being introduced, and sublimation begins. The sublimation is promoted by the hot walls of the receptacle, as well as by the hot gas introduced through the pipe 7 and the coil 8, and by the agitation of the material. When the temperature has again reached its first high point within the apparatus, the damper 12 and the valve 28 are again closed, and another charge is introduced by means of the valves 10 and 11. This loading cycle is continued until a full charge has been introduced into the receptacle. By proceeding in the manner above described, with gradual and intermittent addition of further amounts of anthraquinone, and heating of the charge as introduced, the sublimation can be effected in such a manner as to obtain a practically continuous operation, except for such interruptions as are required by the addition of further increments of the charge. Furthermore, by continuing the addition of further amounts of anthraquinone, as that contained in the receptacle is gradually carried over by sublimation, the operation can be continued for relatively long periods of time, with greatly increased capacity of the apparatus, as well as with more accurate control of conditions which effect the equality and yield of the sublimate.

As the process is continued, the fresh amounts of anthraquinone added are brought into contact with a large amount of heated material, but this will not interfere materially with the continuity of the operation, except for the time required for charging since the material previously charged has attained the requisite temperature for sublimation, and the sublimation of such material will continue when the steam is again turned on and while the fresh increments of the charge are being brought to the requisite temperature.

When the sublimation has continued over a length of time such that the amount of non-sublimable material remaining in the receptacle 1 is large, it is desirable that such residue be discharged from the vessel. For this purpose I provide a spray pipe 17 within the vessel near the top thereof, which receives its supply of water or other cooling medium from a pipe 16, a valve 18 being provided for controlling the flow of the water. When it is desired to discharge the residue of non-sublimable material, the steam supply is shut off, and the valve 18 is opened. The spray of cooling medium falls upon the residue, which is caused to solidify in the form of granules, and to break off from the sides of the receptacle, and from the pipe and other parts. When this has been accomplished, the spray is shut off, the discharge valve 19 provided at the bottom of the receptacle, is opened, so that the residue will be discharged. Thus the residue can be removed without completely cooling the vessel and in a relatively short time, and with consequent economy. By removing the residue without completely cooling the receptacle, heating losses are reduced, and the vessel can be again charged and the cycle recommenced. An insulating coating or lagging 20 is provided for the vessel 1 and for the jacket 2 and this lagging and the jacket also effect reduction in heat losses.

In the treatment of anthraquinone, for instance, the crude anthraquinone is charged into the receptacle 1 as above described, and preheated steam is supplied from a preheater at a temperature of about 410° C. The temperature of the steam as it leaves the jacket is about 315° C., while the average temperature of the interior of the sublimer is about 300° C. The temperature within the receptacle may advantageously be raised to about 350° C. before charging, in order to offset the cooling effect when a new charge is introduced. The temperature of the condensate as it leaves the condenser may vary somewhat, but it is ordinarily about 50° C., about 25° above that of the cooling water introduced. The steam may thus be introduced in the sublimer at a pressure of about 5 pounds per square inch, depending upon the body of material through which it is caused to pass. The steam which passes through the jacket and does not enter the interior of the sublimer is diverted into a low pressure steam line through the valve 21. In the sublimation of anthracene, the temperature can be reduced about 50° below that necessary for anthraquinone, although higher temperatures may also be used.

In the modified construction shown in Figure 2, the bottom of the vessel or receptacle 51 has a double wall, with an inner opening 52 therein. This opening or cavity 52 may be filled with a suitable material having a high specific gravity and high specific heat through the pipe 53. The jacket 54 is similar in construction to that of Figure 1.

By the provision of the agitator arranged in such manner that the material as it becomes plastic is scraped from the walls of the vessel, so that fresh portions of the charge can come into contact with the wall, the charge as a whole can be rapidly brought to a plastic state, such that dusting will be prevented. Without the agitator or scraper, when the material is charged in a finely divided form, the material which is near the heated walls of the vessel becomes heated first and becomes plastic, while the material which is away from the walls is heated but slowly, and remains pulverulent for a much longer time. If steam or other gas is introduced into the charge, prior to the attaining of plasticity, fine particles of the crude material will be carried over; but with the agitator, operating in the manner described, the time required for the making plastic of the entire mass is greatly reduced, so that the charge can readily be brought to plasticity, and dusting prevented.

I claim:

1. Sublimation apparatus adapted for carrying out the sublimation in a substantially continuous manner of pulverulent material which becomes plastic at the sublimation temperature, comprising a receptacle having a heating jacket, a stirrer within the receptacle arranged near the heated walls thereof to cause effective stirring of that portion of the charge next to the heated walls, said receptacle having a discharge opening, and means within the receptacle for spraying the non-sublimed residue with liquid, whereby the highly heated residue can be converted into a granular form to permit it to be removed from the discharge opening.

2. Sublimation apparatus adapted for carrying out the sublimation in a substantially continuous manner of pulverulent material which becomes plastic at the sublimation temperature, comprising a thick-walled vessel, means for heating the walls, a stirrer within the vessel arranged near the heated walls to cause effective stirring of that portion of the charge next to the heated walls, means for successively introducing small charges into the vessel, means for circulating a current of heated gas through the vessel to promote sublimation, a discharge opening in the bottom of the vessel and means within the vessel for spraying the non-sublimed residue with liquid, whereby the highly heated residue can be converted into a granular form to permit its removal through the discharge opening.

3. A sublimation apparatus, comprising a receptacle having a heating jacket, a stirrer within the receptacle arranged to stir the charge during sublimation, said stirrer being arranged near the heated walls of the receptacle to cause effective stirring of that portion of the charge next to the heated walls, means for introducing superheated steam into the material undergoing sublimation, a feed hopper having means for successively introducing charges into the receptacle, a condenser for the sublimed material provided with means for introducing directly into the interior thereof a spray of cooling liquid, a conduit from the receptacle to the condenser, and means for shutting off said conduit during charging.

4. Sublimation apparatus, comprising a jacketed vessel having means for simultaneously circulating a heated gas through the jacket and through the receptacle, or for alternately circulating said gas through the jacket or through the receptacle, a condenser for the sublimate connected with the vessel, a valve for controlling the communication between the vessel and the condenser, and means for successively feeding charges of material to the vessel, and means for spraying the contents of the receptacle for the purpose specified.

5. A sublimation apparatus, comprising a thick walled receptacle having a heating jacket, a stirrer within the receptacle arranged to stir the charge during sublimation, said stirrer being arranged near the heated walls of the receptacle to cause effective stirring of that portion of the charge next to the heated walls, means for introducing superheated steam into the material undergoing sublimation, a feed hopper having means for successively introducing charges into the receptacle, a condenser for the sublimed material provided with means for introducing directly into the interior thereof a spray of cooling liquid, a conduit from the receptacle to the condenser, and means for shutting off said conduit during charging.

In testimony whereof I affix my signature.

CROSBY FIELD.